United States Patent [19]

Büchele-Buecher

[11] Patent Number: 4,803,925
[45] Date of Patent: Feb. 14, 1989

[54] DEVICE FOR THE LIMITATION OF GAS PRESSURE IN A COMBUSTION CHAMBER PROVIDED INSIDE A PROJECTILE

[75] Inventor: Sigfrid Büchele-Buecher, Meerbusch-Strümp, Fed. Rep. of Germany

[73] Assignee: Rheinmetall GmbH, Düsseldorf, Fed. Rep. of Germany

[21] Appl. No.: 101,217

[22] Filed: Sep. 25, 1987

[30] Foreign Application Priority Data

Sep. 25, 1986 [DE] Fed. Rep. of Germany ....... 3632553

[51] Int. Cl.$^4$ .......................... F42B 15/00; F02K 9/38
[52] U.S. Cl. .................................... 102/381; 244/3.22; 239/265.19
[58] Field of Search ....................... 102/381; 244/3.22; 239/265.19, 265.23

[56] References Cited

U.S. PATENT DOCUMENTS

| | | | |
|---|---|---|---|
| 3,204,405 | 9/1965 | Warren et al. | 239/265.23 |
| 3,239,150 | 3/1966 | Chisel | 239/265.23 |
| 3,330,483 | 7/1967 | Lewis | 239/265.23 |
| 3,740,003 | 6/1973 | Ayre et al. | 244/3.22 |
| 3,927,849 | 12/1975 | Kovalenko et al. | 244/3.22 |
| 4,085,909 | 4/1978 | East et al. | 244/3.22 |
| 4,413,795 | 11/1983 | Ryan | 244/3.22 |
| 4,550,888 | 11/1985 | Douglass et al. | 244/3.22 |

Primary Examiner—Deborah L. Kyle
Assistant Examiner—Michael J. Carone
Attorney, Agent, or Firm—Spencer & Frank

[57] ABSTRACT

A device for the limitation of gas pressure in a projectile having an outer shell by the production of a control stream comprises a combustion chamber disposed inside the projectile; the combustion chamber having a combustion chamber lid; control lines connected to be changed by gas from the combustion chamber for transferring the gas pressure from the combustion chamber; monostable fluidic elements being arranged in the control lines in a region of the combustion chamber lid for assisting in confining the control stream; branching lines disposed in the lid and connected with the monostable fluidic elements, the branching lines including vent openings in the outer shell for releasing gas to the atmosphere and an overpressure element for permitting gas to be expelled from the combustion chamber when an overpressure exists therein, whereby gas expelled via the overpressure element assists in the production of the control stream.

6 Claims, 3 Drawing Sheets

DEVICE FOR THE LIMITATION OF GAS PRESSURE IN A COMBUSTION CHAMBER PROVIDED INSIDE A PROJECTILE

BACKGROUND OF THE INVENTION

1. Field of the Invention

The invention relates to a device for the limitation of gas pressure in a combustion chamber arranged inside a projectile.

2. Discussion of the Prior Art

For this type of gas pressure limitation in projectiles it is known to use mechanically actuated overpressure valves which are usually held in the closed position by springs. The valves are subjected to high combustion chamber pressures and open corresponding to a comparatively large excess amount of gas that needs to be vented. The valves have to be configured sufficiently sturdy with regard to the high combustion chamber pressures. In known valve systems a certain slow reaction is the result of the large spring-mass system, which is especially disadvantageous in case of shocklike pressure loads.

SUMMARY OF THE INVENTION

It is an object of the present invention to provide a space-saving, safe as well as fast-acting device for limiting the overpressure in combustion chambers provided inside a projectile.

The above and other objects are accomplished by the invention by a device for the limitation of gas pressure in a projectile having an outer shell by the production of a control stream comprises means defining a combustion chamber disposed inside the projectile; the combustion chamber having a combustion chamber lid; control lines connected to be charged by gas from the combustion chamber for transferring the gas pressure from the combustion chamber; monostable fluidic elements being arranged in the control lines in a region of the combustion chamber lid for assisting in confining the control stream; branching lines disposed in the lid and connected with the monostable fluidic elements, the branching lines including vent openings in the outer shell for releasing gas to the atmosphere and an overpressure element for permitting gas to be expelled from the combustion chamber when an overpressure exists therein, whereby gas expelled via the overpressure element assists in the production of the control stream.

The invention is of an especially advantageous nature in that monostable fluidics wall jet elements and preferably also deflection channels are provided in the combustion chamber lid which comprises the only space of a control block in a combustion chamber of a projectile not used so far, thereby making possible a considerable reduction of the total space requirements compared to customary arrangements. A preferred embodiment is that two fluidics wall jet elements with their branching lines and control lines such that they are mirror images of each other. The outlet openings of the branching lines or the like are pointed in opposite directions so that the forces exerted on the projectile by the streaming gas are mutually cancelled, thus achieving a venting of the gas free from reactive forces.

Preferably the fluidics elements are equipped with a wall directing the gas stream in the direction of useful work and opposite thereof are branching lines limited by or originating from another guide wall. In the stable state of the fluidics element the gas stream follows the wall leading in the direction of useful work and it being possible to deflect it to the other wall if an overpressure occurs.

The direction of useful work leads to the control jets supplied by the combustion chamber.

In a preferred embodiment an overpressure element configured as a reversing device has a control opening in the wall which is charged by a auxiliary gas stream. The control opening leads in the direction of useful work so that the supplemental gas stream exiting from this control opening when the selected pressure is exceeded, deflects the main gas stream towards the deflection wall and the deflection channel. In this embodiment there are no mechanically actuated parts for control in the main gas stream and control is provided only depending on the strength of the auxiliary gas stream exiting from the control opening. By this design short reaction times on the order of 2 ms are possible.

For determination of the reaction pressure, a miniture overpressure valve that has a short reaction time based on small spring-mass forces can be provided in the auxiliary gas stream which may contain, for example, only 5% of the total amount of gas may be supplied. This overpressure valve is adjustable in order to fix different reaction pressures.

In another embodiment of the invention, the overpressure element configured as a reversing device can be provided in the form of a throttle, which is known per se, and the throttle can be disposed in the wall of the main gas stream in a manner not shown. When using such a throttle, the auxiliary gas stream and mechanically operated elements in the main gas stream can be dispensed with. The short reaction times in the monostable fluidics wall jet elements are achieved on the basis of the Coanda effect for control of the gas streams.

So that the fluidics elements quickly and safely return into the stable when the pressure drops below the pressure selected, the wall deflecting the gas stream or the branching lines can be provided with vent openings, slits or the like.

BRIEF DESCRIPTION OF THE DRAWINGS

The invention may be better understood by referring to the detailed description of the invention when taken in conjunction with the accompanying drawings in which.

DESCRIPTION OF THE PREFERRED EMBODIMENTS

Figure 1:
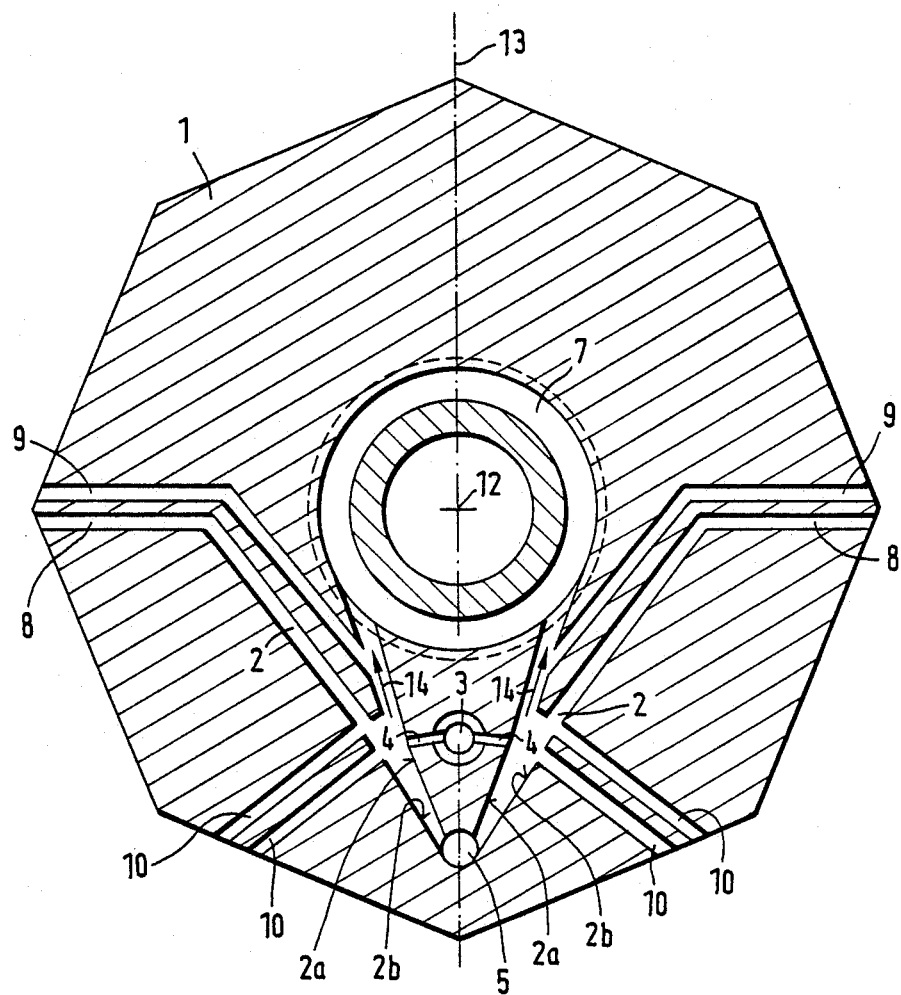
FIG. 1 is a sectional view of a device for limiting the overpressure taken along line I—I of FIG. 2.
Figure 2:
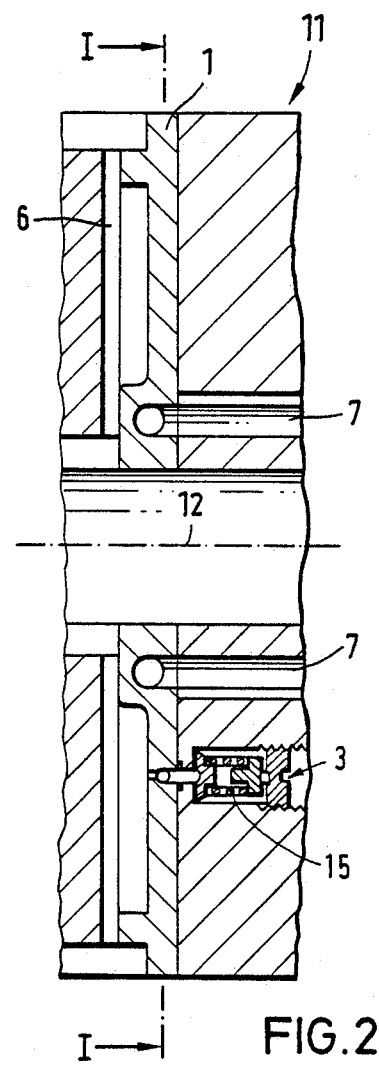
FIG. 2 is a partial longitudinal section of a combustion chamber and the combustion chamber lid of a projectile.

Referring to FIGS. 1 and 2, two monostable fluidics wall-jet elements 2 are disposed in a plane extending transversely to the longitudinal projectile axis 12 in a combustion chamber lid 1 coaxially disposed inside a projectile 11. These wall-jet elements 2 are configured such that they are mirror images of each other across the plane of symmetry 13 extending in a longitudinal direction. They each have a wall 2a directing a gas stream in the direction of useful work 14 and a guide wall 2b toward which the gas stream is turned to provide a desired deflection. The projectile 11 may be a terminal-phase guided artillery ammunition, for example, a 155 mm. High-pressure gases are created in a combustion chamber 6 and are directed via a gas conduit 5 into the combustion chamber lid 1 and there into the fluidics wall-jet elements 2. Combustion chamber 6 utilities a solid fuel for combusting. In the stable state of the fluidics elements, i.e. no overpressure in the combustion chamber, the gas follows along walls 2a into control line 7 and then to a supply chamber, not shown, in the direction of useful work 4 from which they can charge, in a manner not shown, the control jets of the projectile 11. A miniature overpressure valve 3, which is known per se, is disposed as a reversing device on the plane of symmetry 13 and connected with the walls 2a via control openings 4. This valve 3 is charged by the high-pressure gas from the combustion chamber 6. If a pressure set by means of a spring 15 at the over-pressure valve 3 is exceeded, for example, when all the control jets connected with the supply chamber are closed, the overpressure valve 3 opens and allows an auxiliary gas stream to pass through to the control openings 4 in the walls deflecting in the direction of useful work. The gas from the auxiliary stream exiting at the control opening 4 deflects the main gas streams outwardly in the direction of the walls 2b and the main gas streams can enter the branching lines 8 and exit the projectile 11 from there in opposite directions, thus not creating any forces reacting unilaterally on the projectile 11. The amount of the auxiliary gas stream is only approximately 5% of the main gas stream. Additional vent openings 9, 10, starting along the wall 2b and also disposed symmetrically to the combustion chamber lid and exiting the projectile in opposite directions ensure that the system remains stable and that, when the overpressure is reduced and the valve 3 closes, the monostable fluidics elements return into the stable state in which the gas streams are directed along the walls 2a to the control line 7. The passage surrounding axis 12 merely clarifies a passage channel of the charge which is not illustrated.

Figure 3:
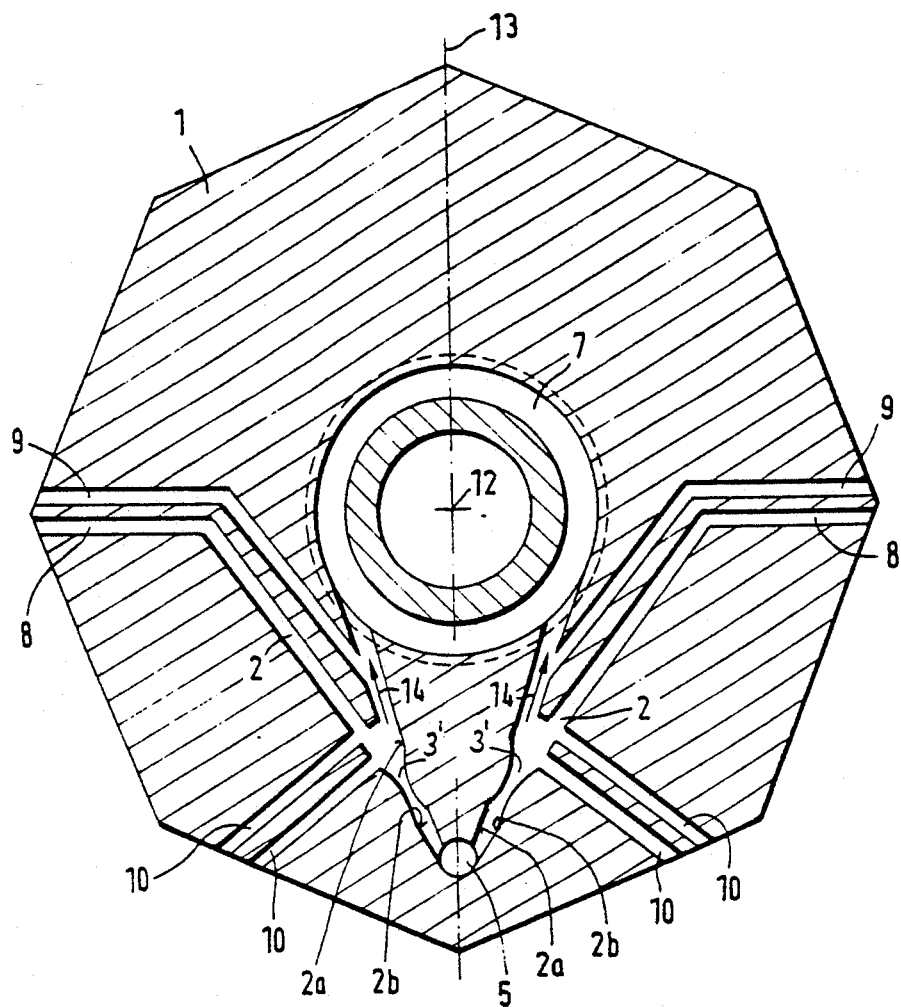
FIG. 3 is a sectional view of a modified device for limiting the overpressure in the combustion chamber of a projectile.

In a further exemplary embodiment shown in FIG. 3, the overpressure element configured as a reversing device 3' can also be provided in the form of a known throttle which, however, is disposed in the wall 2a, 2b of the main gas stream.

The throttle is this arrangement, viewed in the direction of useful work 14, is disposed in front of the branching lines 8. The cross section of the throttle leads to a constriction between the walls 2a and 2b. A disposal into the branching lines 8 takes place for reduction of a desired overpressure by means of a back pressure of excessive gas with corresponding throttle cross section.

The present disclosure relates to the subject matter disclosed in German No. P 36 32 553.8 of Sept. 25, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A device for the limitation of gas pressure in a projectile having an outer shell by the production of a control stream comprising:

means defining a combustion chamber disposed inside said projectile; said combustion chamber having a combustion chamber lid; control lines connected to be charged by gas from said combustion chamber for transferring the gas pressure from said combustion chamber; monostable fluidic elements arranged in said control lines in a region of said combustion chamber lid for assisting in confining the control stream; branching lines disposed in said lid and connected with said monostable fluidic elements, said branching lines including vent openings in said outer shell for releasing gas to the atmosphere and an overpressure element for permitting gas to be expelled from said combustion chamber when an overpressure exists therein; said monostable fluidic elements comprise at least two wall-jet elements, with each of said wall-jet elements having a first wall for directing the gas toward said control lines and a second wall which has an opening for at least one of said branching lines; each of said wall-jet elements and said branching lines being mirror images of the other of said respective wall-jet elements and said branching lines along a plane of symmetry; said branching lines further comprise outlet openings; with said outlet openings pointing in respectively opposite directions; and said overpressure element is disposed in said plane of symmetry and said overpressure element comprises control openings in said first wall, so that when said predetermined pressure is exceeded in said combustion chamber a part of said gas passes through said control openings, whereby gas expelled via said overpressure element assists in the production of the control stream.

2. A device according to claim 1, wherein said second wall and said branching lines are operatively connected with said vent openings.

3. A device according to claim 1, wherein said overpressure element comprises a pressure relief valve, said pressure relief valve being operatively connected between said combustion chamber and said control lines.

4. A device according to claim 1, wherein said overpressure element comprises a throttle, said throttle being operatively connected between said combustion chamber and said control lines.

5. A device for the limitation of gas pressure in a projectile having an outer shell by the production of a control stream comprising:

means defining a combustion chamber disposed inside said projectile; said combustion chamber having a combustion chamber lid; control lines connected to be charged by gas from said combustion chamber for transferring the gas pressure from said combustion chamber; monostable fluidic elements arranged in said control lines in a region of said combustion chamber lid for assisting in confining the control stream; branching lines disposed in said lid and connected with said monostable fluidic elements, said branching lines including vent openings in said outer shell for releasing gas to the atmosphere and an overpressure element for permitting gas to be expelled from said combustion chamber when an overpressure exists therein, with said overpressure element comprising a pressure relief valve which is operatively connected between said combustion chamber and said control lines, whereby gas expelled via said overpressure element assists in the production of the control stream.

6. A device for the limitation of gas pressure in a projectile having an outer shell by the production of a control stream comprising:

means defining a combustion chamber disposed inside said projectile; said combustion chamber having a combustion chamber lid; control lines connected to be charged by gas from said combustion chamber for transferring the gas pressure from said combustion chamber; monostable fluidic elements arranged in said control lines in a region of said combustion chamber lid for assisting in confining the control stream; branching lines disposed in said lid and connected with said monostable fluidic elements, said branching lines including vent openings in said outer shell for releasing gas to the atmosphere and an overpressure element for permitting gas to be expelled from said combustion chamber when an overpressure exists therein, with said overpressure element comprising a throttle which is operatively connected between said combustion chamber and said control lines, whereby gas expelled via said overpressure element assists in the production of the control stream.

* * * * *